Oct. 30, 1951 D. B. GARDINER 2,573,563
FLOW CONTROL AND PRESSURE REGULATING DEVICE
Filed Aug. 27, 1947
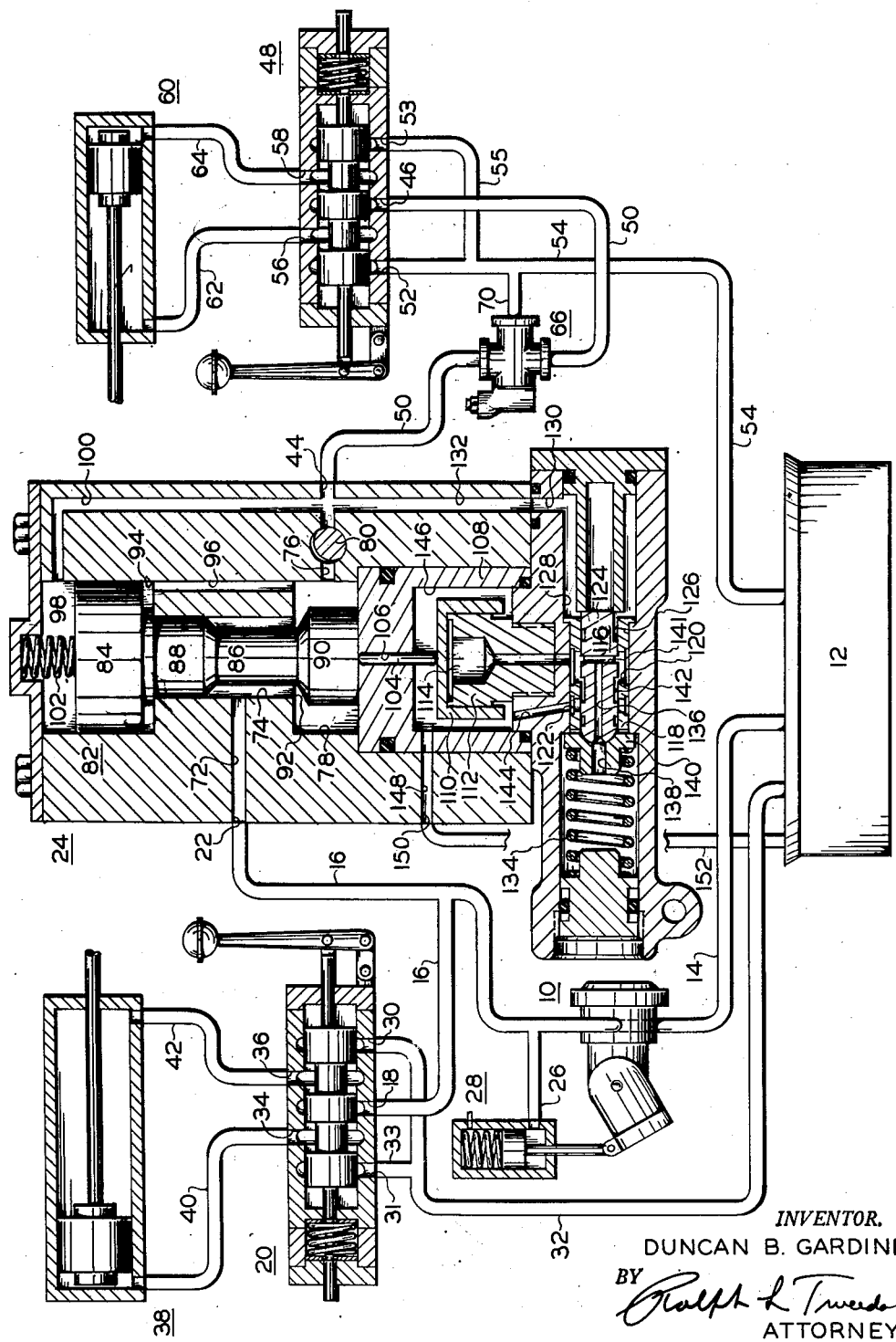
INVENTOR.
DUNCAN B. GARDINER
BY
ATTORNEY Patented Oct. 30, 1951

2,573,563

UNITED STATES PATENT OFFICE 2,573,563

FLOW CONTROL AND PRESSURE REGULATING DEVICE

Duncan B. Gardiner, Detroit, Mich., assignor to Vickers Incorporated, Detroit, Mich., a corporation of Michigan Application August 27, 1947, Serial No. 770,883

5 Claims. (Cl. 60—97)

1

This invention relates to power transmissions, particularly to those of the type comprising two or more fluid pressure energy translating devices, one of which may function as a pump and another as a fluid motor.

The invention is generally concerned with a power transmission system for driving a plurality of fluid motors having different fluid volume and pressure requirements. In particular, the invention is concerned with a transmission of the above character wherein it is necessary to drive at least one of the motors at a regulated rate of speed and, in addition, at a reduced pressure.

It is an object of this invention to provide a device for a transmission as above described which may be connected to a high pressure fluid source and which will deliver fluid at a regulated volume and at a reduced pressure.

Further objects and advantages of the present invention will be apparent from the following description, reference being had to the accompanying drawing wherein a preferred form of the present invention is clearly shown.

In the drawing:

The single figure is a diagrammatic view of a hydraulic power transmission system embodying a cross-sectional view of a preferred form of the present invention.

Referring now to the drawing, there is shown a variable delivery pump 10 which may be driven by an electric motor (not shown). The pump 10 is connected to a tank 12 by a suction conduit 14 and is also provided with a delivery conduit 16 which is connected to a pressure port 18 of a closed center type four-way directional valve 20 and also to an inlet port 22 of a flow control and pressure regulating device 24.

A branch conduit 26 of the pump delivery conduit 16 is connected to an actuating piston 28 which is mechanically linked to the pump 10 for varying the volume thereof in the conventional manner.

The control valve 20 is also provided with tank ports 30 and 31 which are connected to the tank 12 by conduits 32 and 33 and is also provided with motor ports 34 and 36. The motor ports 34 and 36 are connected to the head and piston rod ends of a piston cylinder motor 38, respectively, by means of conduits 40 and 42.

The device 24 is provided with an outlet port 44 which is connected to a pressure port 46 of a closed center type four-way directional valve 48 by a conduit 50. The directional valve 48 is provided with tank ports 52 and 53 which are connected to the tank 12 by conduits 54 and 55. The

2 valve 48 also has motor ports 56 and 58 which are connected to the rod and head ends of a piston cylinder motor 60, respectively, by conduits 62 and 64. A suitable relief valve 66 is incorporated in the conduit 50 and will exhaust excessive pressure fluid caused by temperature expansion to the tank 12 by means of an exhaust conduit 70 connected to the conduit 54.

The device 24 is provided with an inlet passage 72 which connects the inlet port 22 to an inlet chamber 74 and also an outlet passage 76 which connects an outlet chamber 78 with the outlet port 44. Incorporated in the outlet passage 76 is a suitable adjustable throttle 80.

For the purpose of maintaining a regulated flow rate through the throttle 80, there is provided a pressure compensating valve 82 which comprises a piston 84 connected to which is a stem 86 having lands 88 and 90. The land 90 is adapted to control the flow of fluid from the inlet chamber 74 to the outlet chamber 78 by controlling the opening of a seat 92. The outlet chamber 78 ahead of the throttle 80 is connected to a chamber 94 on the under side of the piston 84 by a passage 96. The outlet passage 76 beyond the throttle 80 is connected to a chamber 98 located above the piston 84 by a passage 100. A spring 102, mounted in the chamber 98, biases the piston 84 so that the inlet valve 90 opens the seat 92.

The compensating valve 82 is adapted to be responsive to the pressure ahead of and beyond the throttle 80 so as to maintain a constant pressure drop across the latter. The pressure drop is determined by the setting of the spring 102.

For the purpose of preventing the pressure beyond the throttle 80 from increasing beyond a predetermined maximum, provision is made for closing the compensating valve by means of a floating pin 104. The pin 104, which is shiftable within a bore 106 of a member 108, rests on a piston 110 which is shiftable on a guide member 112. Guide member 112 is provided with a pressure fluid passage 114 leading directly to the under side of the piston 110. The passage 114 is opened and closed to communication with the passage 76 beyond the throttle 80 by means of a pressure responsive control valve indicated by the numeral 116.

The valve 116 is shiftable within a sleeve 118 provided with ports 120 and 122, the former of which is connected to the piston passage 114 and the latter of which acts as a drain port 122. The valve 116 is also provided with a land 124 at its right end having a recess 126 which breaks over the port 120 when the valve 116 is shifted leftwardly. For the purpose of shifting the spool leftwardly, there is provided a pressure chamber 128 at the right end of valve 116 which is connected to the outlet passage 76 beyond the throttle 80 by means of a passage 130 and a passage 132 in alignment with the latter. Thus, the right end of valve 116 is in continuous communication with the outlet passage 76 beyond the throttle 80. However, a pressure at the outlet 44 of the device 24 equivalent to the resistance of a spring 134 which biases valve 116 to the closed position must occur before the control valve 116 will shift leftwardly to admit pressure to the piston passage 114.

The valve 116 is also provided with a longitudinal passage 136 in alignment with a passage 138 in a spring retainer 140. Fluid displacement caused by the shifting of the valve 116 is free to flow through the passages 136 and 138 to the sleeve port 122 by means of a transverse passage 141. The port 120 is connected in the position of the valve shown to sleeve port 122 by a groove 142 in the valve 116. The port 122 is connected by a passage 144 to a chamber 146 within the member 108 and which surrounds the piston 110. The chamber 146 is connected to the tank 12 by means of a passage 148 connected to a drain port 150 and a conduit 152 connected to the port 150 and the tank 12.

The motor 60, as shown, has a smaller fluid displacement than that of motor 38 although this relation is not necessary. In addition, it should be assumed that it is desirable to operate the load device (not shown) driven by the motor 60 at a regulated rate of speed and that the pressure required is less than that created in the other part of the system ahead of the flow control and pressure regulating device 24.

With the pump 10 running and the control valves 20 and 48 shifted so as to direct pressure fluid to the head end of both motors, the operation of the transmission is as follows:

Pressure fluid will be delivered by the pump 10 by means of the delivery conduit 16 to the pressure port 18 of the control valve 20. Pressure fluid is directed by the control valve 20 by means of motor port 34 to the conduit 40 and the head end of motor 38. Fluid discharging from the rod end of motor 38 is free to flow to tank 12 by means of conduit 42, motor port 36 and tank port 30 of control valve 20, and the conduit 32. Simultaneously, pressure fluid is also delivered by the pump 10 to the inlet port 22 of the device 24.

The throttle 80 will have originally been adjusted to a predetermined setting. As pressure fluid flows from the inlet port 22 to the outlet port 44 of the device 24, the compensating valve 82 will maintain a constant pressure drop across the throttle 80 so as to maintain the flow through the throttle 80 constant. Fluid flows through the inlet port 22 to the outlet port 44 by means of inlet passage 72, inlet chamber 74, seat 92, outlet chamber 78, and outlet passage 76 within which is incorporated throttle 80.

Any increase or decrease of pressure in the chamber 78 is immediately present in chamber 94 by means of passage 96 connected to the outlet chamber 78. The land 90 controls the opening of the seat 92 and assumes various regulating positions between the fully open and fully closed positions so as to admit more or less fluid to the outlet chamber and maintain the pressure drop across the throttle 80 constant and the flow therethrough regulated. This regulated flow is delivered to the head end of motor 60 by means of conduit 50, ports 46 and 58 of control valve 48, and the conduit 64. Fluid displaced from the rod end of the motor 60 is free to discharge to the tank 12 by means of conduit 62, the ports 56 and 52 of control valve 48, and the conduit 54.

The compensating valve not only cooperates with the throttle 80 to maintain a uniform regulated flow rate reduced in volume with that flowing to the motor 38, but in addition acts as a pressure reducing valve. In operation, the valve 90 restricts the opening of the seat 92 so that the pressure existing ahead of the compensating valve 82 in the rest of the system is reduced when it enters the outlet chamber 78. That is, a pressure drop occurs across the seat opening 92. There is a further pressure drop across the throttle 80 which is determined by the setting of the spring 102. Consequently, the flow rate to the motor 60 is not only being constantly regulated at a volume less than that flowing to the motor 38, but in addition the pressure is constantly reduced from that in the other part of the system.

The pressure in outlet chamber 78 is of course determined by the load resistance encountered by motor 60 and may be any value from zero up to a preset maximum. The maximum pressure at the outlet of the device 24 is determined by the resistance of the spring 134 which biases the control valve 116 to the closed position. If, at any time, the pressure at the outlet of the device 24 reaches this predetermined maximum, the control valve 116 shifts leftwardly and pressure fluid is admitted by the valve to the piston passage 114. The piston 110 is thereupon shifted upwardly and the floating pin 104 shifts upwardly therewith to shift the compensating valve 82 upwardly, and the valve 90 to the closed position. Valve 90 closes the seat 92 and prevents flow from the inlet chamber 74 to the outlet chamber 78. When the pressure decreases below the setting of the spring 134, the spring shifts the control valve 116 rightwardly, and the piston 110 together with the pin 104 shifts downwardly to permit the compensating valve to operate once again in a normal manner.

If the control valves 20 and 48 are shifted to reverse the direction of the motors 38 and 60 the device 24 will operate in the same manner for regulating the volume to the motor 60 at a reduced rate and at a reduced pressure.

If the control valve 48 is shifted to the closed center position, and the control valve 20 is shifted from the closed center position, fluid is delivered from the pump 10 only to the motor 38 and the device 24 does not in any manner interfere with its operation.

If the control valve 20 is shifted to the closed center position and the control valve 48 shifted from the closed center position, fluid from the pump 10 is delivered only to the motor 60 in such volume and at a pressure regulated by the device 24.

It should thus be noted that the device 24, when connected to a high pressure fluid source, will efficiently deliver fluid at a regulated volume and at a regulated reduced pressure.

While the form of embodiment of the invention as herein disclosed constitutes a preferred form, it is to be understood that other forms might be adopted, all coming within the scope of the claims which follow.

What is claimed is as follows:

1. A flow control and pressure regulating mechanism comprising in combination a housing having an inlet adapted to be connected to a high pressure fluid source and an outlet through which fluid is adapted to flow at a substantially uniform volume and at a reduced pressure to be maintained below a predetermined maximum, in series between the inlet and the outlet a throttle and a pressure compensating valve the latter of which is responsive to the pressure drop across the throttle for reducing the pressure from that at the inlet and for maintaining a substantially uniform flow rate through the throttle, and pressure responsive means for closing the compensating valve and blocking flow from the inlet to the outlet upon predetermined increases of pressure beyond the throttle.

2. A flow control and pressure regulating mechanism comprising in combination a housing provided with a flow passage having an inlet adapted to be connected to a high pressure fluid source and an outlet through which fluid is adapted to flow at a substantially uniform volume and reduced pressure to be maintained below a predetermined maximum, in series in the flow passage an adjustable throttle and a pressure compensating valve the latter of which is responsive to the pressure drop across the throttle for reducing the pressure from that at the inlet and for maintaining a substantially uniform flow rate through the throttle, and means responsive to pressure changes in the flow passage beyond the throttle for operating the compensating valve to the closed position to maintain the pressure beyond the throttle below a predetermined maximum.

3. A flow control and pressure regulating mechanism comprising in combination a housing provided with a flow passage having an inlet adapted to be connected to a high pressure fluid source and an outlet through which fluid is adapted to flow at a substantially uniform volume and reduced pressure to be maintained below a predetermined maximum, in series in the flow passage an adjustable throttle and a pressure compensating valve the latter of which is responsive to the pressure drop across the throttle for reducing the pressure from that at the inlet and for maintaining a substantially uniform flow rate through the throttle, and means operatively associated with the compensating valve responsive to predetermined pressure increases beyond the throttle for closing the compensating valve until the pressure beyond the throttle falls below a predetermined maximum.

4. In a hydraulic power transmission having a constant pressure fluid source and a plurality of fluid motors at least one of which has substantially uniform volume displacement and reduced limited pressure requirements the combination therewith of a flow control and pressure regulating device comprising a housing having an inlet connected to the fluid source, an outlet connected to one of the motors, a flow passage connecting the inlet to the outlet, in series in said passage an adjustable throttle and a pressure compensating valve responsive to the pressure drop across the throttle for reducing the pressure at the outlet from that at the inlet and maintaining a uniform flow rate through the throttle, and means operatively associated with the compensating valve responsive to predetermined pressure increases beyond the throttle and closing the compensating valve until the pressure beyond the throttle falls below a predetermined maximum.

5. In a hydraulic power transmission having a constant pressure fluid source and a plurality of fluid motors at least one of which has substantially uniform volume displacement and reduced limited pressure requirements the combination therewith of a flow control and pressure regulating device comprising a housing having an inlet connected to the fluid source, an outlet connected to one of the motors, a flow passage connecting the inlet to the outlet, in series in said passage an adjustable throttle and a pressure compensating valve responsive to the pressure drop across the throttle for reducing the pressure at the outlet from that at the inlet and maintaining a substantially uniform flow rate through the throttle, and pressure responsive means for closing the compensating valve and blocking flow from the source to the outlet when the pressure at the outlet has reached a predetermined maximum.

DUNCAN B. GARDINER.

REFERENCES CITED

The following references are of record in the file of this patent:

UNITED STATES PATENTS

| Number | Name | Date |
|---|---|---|
| 1,467,522 | Amsler | Sept. 11, 1923 |
| 1,593,601 | Rush | July 27, 1926 |
| 1,620,881 | Fisher | Mar. 15, 1927 |
| 2,102,865 | Vickers | Dec. 21, 1937 |
| 2,139,050 | Vickers | Dec. 6, 1938 |
| 2,291,731 | Lake et al. | Aug. 4, 1942 |
| 2,306,379 | Conradson | Dec. 29, 1942 |
| 2,328,980 | Herman et al. | Sept. 7, 1943 |
| 2,331,026 | Harrington | Oct. 5, 1943 |